G. R. LANG.
MILLING MACHINE.
APPLICATION FILED DEC. 5, 1908.

963,904.

Patented July 12, 1910.

Witnesses

Inventor
George R. Lang
by
Attorney

UNITED STATES PATENT OFFICE.

GEORGE R. LANG, OF MEADVILLE, PENNSYLVANIA.

MILLING-MACHINE.

963,904.

Specification of Letters Patent. Patented July 12, 1910.

Application filed December 5, 1908. Serial No. 466,105.

*To all whom it may concern:*

Be it known that I, GEORGE R. LANG, a citizen of the United States, residing at Meadville, in the county of Crawford and State of Pennsylvania, have invented new and useful Improvements in Milling-Machines, of which the following is a specification.

This invention relates to milling machines, and consists in certain improvements in the construction thereof as will be hereinafter fully described and pointed out in the claims.

More particularly the invention relates to an attachment for milling machines which is adapted to be added to the ordinary horizontal miller, and so arranged as to permit of using the horizontal spindle and when desired to also use the vertical spindle simultaneously therewith.

Figure 1:
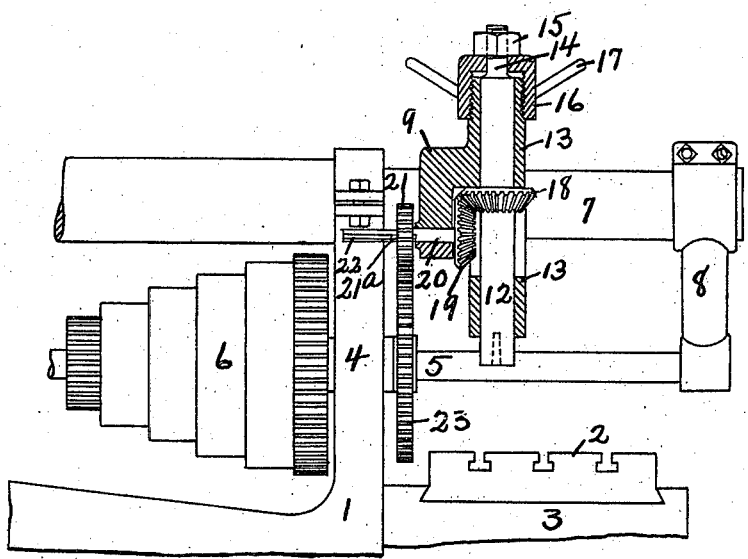
Figure 2:
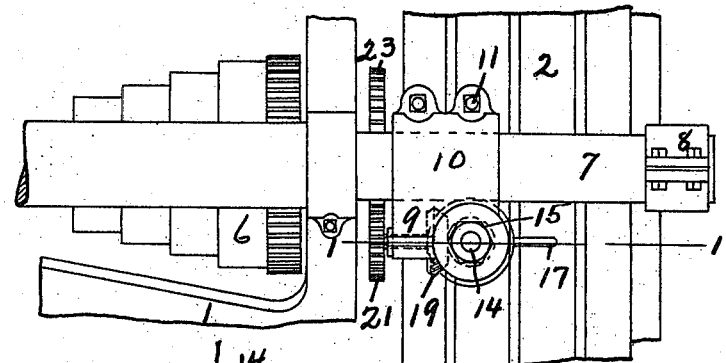
Figure 3:
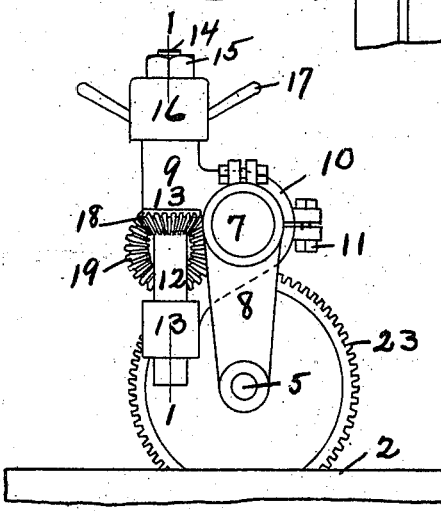

The invention is illustrated in the accompanying drawings as follows:

Figure 1 shows an end elevation of a miller with an attachment thereon, the attachment being in section on the lines 1—1 in Figs. 2 and 3. Fig. 2 is a plan view of the miller with the device in place thereon. Fig. 3 a front elevation.

1 marks the frame of the machine; 2 the bed of the miller; 3 the guide for the bed; 4 the arbor for the horizontal spindle; 5 the horizontal spindle; 6 the driving mechanism for the horizontal spindle; 7 the supporting arm arranged over and parallel with the horizontal spindle and 8 a connection between the supporting arm 7 and the outer end of the spindle. All these parts are of common construction.

The attachment frame 9 has the clamp 10 formed by a split ring and bolt 11, by means of which it may be clamped on the supporting arm 7 in any position desired. The vertical spindle 12 is journaled on the bearings 13—13 in the frame 9. The upper end of the spindle has the reduced portion 14 on which is a nut 15, and the flange nut 16 is screwed onto the upper end of the frame, and provided with the handles 17 by means of which the spindle may be readily adjusted. A bevel gear 18 is arranged on the spindle 12 and locked against rotation thereon by any desired means and meshes a beveled gear 19. The beveled gear 19 is fixed on a shaft 20 which is journaled on the frame 9. A gear 21 is slidingly mounted on a shaft 20 and locked against rotation thereon by the spline 21$^a$ operating in the groove 22 on the shaft. This permits the attachment to be shifted along the arm 7 to any position desired. The gear 21 meshes a gear 23, which is fixed on the spindle 5. The vertical spindle 12 is therefore driven from the spindle 5. It will be noted, however, that the spindle 12 is offset sufficiently from the spindle 5 to permit of its use simultaneously with the spindle 5. That is, both spindles may be used for making a cut at the same time. To accomplish this the attachment is offset from the arm 7 also. It will be noted that the attachment may be swung on the arm 7, so as to take it out of the way without removing it.

What I claim as new is:

1. In an attachment for milling machines, the combination of a hanger adapted to be supported on a supporting arm of a milling machine, and adjusted longitudinally of said arm; a drive shaft carried by the hanger; a spindle on the hanger offset from the arm when the attachment is in place; means for driving the spindle from the shaft; and mechanism for driving the shaft, said means and mechanism being arranged to permit of the adjustment of the hanger on the arm without breaking the driving connection for the spindle.

2. In an attachment for milling machines, the combination of a hanger adapted to be supported and swingingly mounted on a cylindrically shaped supporting arm of a milling machine; a driving shaft carried by the hanger; a spindle on the hanger offset from the arm when the attachment is in place; means for driving the spindle from the shaft; and mechanism for driving the shaft, said means and mechanism being arranged to permit of the adjustment of the hanger on the arm without breaking the driving connection for the spindle.

3. In an attachment for milling machines, the combination of a hanger adapted to be supported on a supporting arm of a milling machine, and adjusted longitudinally of said arm; a drive shaft carried by the hanger; a spindle on the hanger offset from the arm when the attachment is in place; means for driving the spindle from the shaft; and mechanism driven from the working end of the spindle for driving the shaft, said mechanism and means being arranged to permit of the adjustment of the spindle longitudinally of the arm without breaking the driving connection.

In testimony whereof I have hereunto set my hand in the presence of two subscribing witnesses.

GEORGE R. LANG.

Witnesses:
 JOHN SCHULER,
 G. B. BENSON.